US012747634B2

(12) United States Patent
Jeong et al.

(10) Patent No.: US 12,747,634 B2
(45) Date of Patent: Sep. 29, 2026

(54) AI-ASSISTED STRATIGRAPHIC MODELING AND GEOSTEERING UTILIZING GAMMA RAY MEASUREMENTS

(71) Applicant: Schlumberger Technology Corporation, Sugar Land, TX (US)

(72) Inventors: Cheolkyun Jeong, Katy, TX (US); Joseph Gremillion, Houston, TX (US); Firas Al Shaikh Hasan, Katy, TX (US); Vipin Sharma, Sugar Land, TX (US); Paul Cazali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 240 days.

(21) Appl. No.: 18/680,705

(22) Filed: May 31, 2024

(65) Prior Publication Data

US 2025/0369288 A1 Dec. 4, 2025

(51) Int. Cl.

| | |
|---|---|
| ***E21B 7/04*** | (2006.01) |
| ***E21B 44/00*** | (2006.01) |
| ***G01V 5/12*** | (2006.01) |
| *G01V 20/00* | (2024.01) |

(52) U.S. Cl.

CPC ................ *E21B 7/04* (2013.01); *E21B 44/00* (2013.01); *G01V 5/12* (2013.01); *E21B 2200/20* (2020.05); *G01V 20/00* (2024.01)

(58) Field of Classification Search

CPC ........ E21B 7/04; E21B 44/00; E21B 2200/20; G01V 5/12; G01V 20/00

See application file for complete search history.

(56) References Cited

U.S. PATENT DOCUMENTS

| | | | |
|---|---|---|---|
| 10,422,924 | B2 | 9/2019 | Zhang |
| 11,520,077 | B2 | 12/2022 | Denli |
| 11,644,589 | B2 | 5/2023 | Le Guern |
| 11,900,658 | B2 | 2/2024 | Lefranc |

(Continued)

FOREIGN PATENT DOCUMENTS

| | | |
|---|---|---|
| CA | 2920499 C | 9/2023 |

OTHER PUBLICATIONS

Automated Geosteering While Drilling Using Machine Learning. Case Studies, SPE-202046-MS, Denisenko et al., published Oct. 12, 2020 (Year: 2020).*

TST3D: Automated Structural Interpretation in Horizontal Wellbores, URTeC 2889444, Zhang et al., published Jul. 23, 2018 (Year: 2018).*

Automated Gamma Ray-Based Structural Interpretationfor Optimized Geosteering in A Horizontal Well, URTeC: 4240395, Jeong et al., published Jun. 9, 2025 (Year: 2025).*

(Continued)

*Primary Examiner* — Lal Ce Mang

(74) *Attorney, Agent, or Firm* — Jeffrey D. Frantz

(57) ABSTRACT

A method for modeling a subsurface region using Artificial Intelligence (AI), including: drilling of at least one reference well into a subsurface region, initializing a first stratigraphic model of the subsurface region, initializing a first gramma ray model, receiving first gamma ray measurements from a gamma ray sensor coupled to a first tool of a first drill string traversing the subsurface region during the drilling of an additional well, determining that a first difference between the first gamma ray model and the received first gamma ray measurements exceeds an error threshold, updating the first stratigraphic model based on the first difference, updating the first gamma ray model, and outputting the updated first stratigraphic model and the updated first gamma ray model.

21 Claims, 9 Drawing Sheets

(56) References Cited

U.S. PATENT DOCUMENTS

| | | | | |
|---|---|---|---|---|
| 2013/0062057 | A1* | 3/2013 | Smith, Jr. | E21B 43/267 166/254.2 |
| 2015/0134255 | A1* | 5/2015 | Zhang | G01V 1/40 702/14 |
| 2015/0267525 | A1* | 9/2015 | May | E21B 49/00 175/45 |
| 2020/0165911 | A1* | 5/2020 | Thorne | E21B 47/024 |
| 2020/0340350 | A1 | 10/2020 | Denisenko | |
| 2021/0231829 | A1* | 7/2021 | Crawford | G01V 5/12 |
| 2021/0301642 | A1* | 9/2021 | Wicks | E21B 4/02 |
| 2023/0333274 | A1* | 10/2023 | Tian | G01V 1/48 |
| 2024/0141776 | A1* | 5/2024 | Gee | E21B 7/04 |

OTHER PUBLICATIONS

Jeong, C. et al., Automated Gamma Ray-Based Structural Interpretation for Optimized Geosteering in a Horizontal Well, URTeC: 4240395, 2025, 12 pages.

Denisenko et al., Automated Geosteering While Drilling Using Machine Learning. Case Studies, SPE-202046-MS, Paper presented at the SPE Russian Petroleum Technology Conference, Oct. 26-29, 2020, 18 pages.

Zhang et al., Automated Structural Interpretation in Horizontal Wellbores, SPE/AAPG/SEG, Paper presented at the SPE/AAPG/SEG Unconventional Resources Technology Conference, Jul. 23-25, 2018, 15 pages.

* cited by examiner

AI-ASSISTED STRATIGRAPHIC MODELING AND GEOSTEERING UTILIZING GAMMA RAY MEASUREMENTS

BACKGROUND

Drilling engineers use stratigraphic models to understand the formations being drilled and to target specific layers of subsurface geologic formations with a drill string. Conventionally, geoscientists generate these models by hand using information gathered from drilled wells and other prior experience. Generating these stratigraphic models is time consuming and relies on skill and local knowledge which may lead to inconsistencies. Additionally, conventional stratigraphic models are based on one or more wells drilled into the subsurface, but natural variations in the formations traversed during the drilling of a new well can lead to the stratigraphic model having limited usefulness during the drilling of the new well.

Thus, there is a need in the art to be able to develop and modify stratigraphic model for a well being drilled in real time based on data obtained from at least one reference well and data obtained during the drilling of the well.

SUMMARY

A method for modeling a subsurface region, comprising: drilling of at least one reference well into a subsurface region; initializing a first stratigraphic model of the subsurface region at a control system, the first stratigraphic model of the subsurface region showing a representation of a plurality of layers of the subsurface region mapped with respect to total vertical depth (TVD) and total horizontal length (THL); initializing a first gramma ray model at the control system, the first gamma ray model comprising reference gamma ray values indexed over the THL, wherein the reference gamma ray values are obtained during the drilling of the at least one reference well; receiving first gamma ray measurements at the control system from a gamma ray sensor coupled to a first tool of a first drill string traversing the subsurface region during the drilling of an additional well, wherein the control system indexes the received first gamma ray measurements over a first portion of the THL; determining that a first difference between the reference gamma ray values indexed over the first portion of the THL and the received first gamma ray measurements indexed over the first portion of the THL exceeds a first error threshold with the control system; updating the first stratigraphic model based on the first difference to create a first updated first stratigraphic model comprising an updated representation of the position of the plurality of layers of the subsurface region; updating the first gamma ray model to create a first updated first gamma ray model comprising first updated gamma ray values; and outputting the first updated first stratigraphic model and the first updated first gamma ray model.

A method for steering a first tool of a first drill string traversing a subsurface region, comprising: drilling of at least one reference well into a subsurface region; initializing a first stratigraphic model of the subsurface region at a control system, the first stratigraphic model of the subsurface region showing a representation of a plurality of layers of the subsurface region mapped with respect to total vertical depth (TVD) and total horizontal length (THL); initializing a first gramma ray model at the control system, the first gamma ray model comprising reference gamma ray values indexed over the THL, wherein the reference gamma ray values are obtained during the drilling of the at least one reference well into the subsurface region; receiving first gamma ray measurements at the control system from a gamma ray sensor coupled to a first tool of a first drill string traversing the subsurface region during the drilling of an additional well, wherein the control system indexes the received first gamma ray measurements over a first portion of the THL; determining that a first difference between the reference gamma ray values indexed over the first portion of the THL and the received first gamma ray measurements indexed over the first portion of the THL exceeds a first error threshold with the control system; updating the first stratigraphic model based on the first difference to create a first updated first stratigraphic model comprising an updated representation of the position of the plurality of layers of the subsurface region; updating the first gamma ray model to create a first updated first gamma ray model comprising first updated gamma ray values; and sending at least one signal with the control system, wherein the at least one signal comprises instructions to steer the first tool of the first drill string in a trajectory based on the first updated first stratigraphic model.

A non-transitory computer-readable medium comprising instructions stored thereon that when executed by one or more processors cause a control system to control a first drill string to target at least one target layer of a subsurface region, the controlling comprising: drilling of at least one reference well; initializing a first stratigraphic model of the subsurface region at a control system, the first stratigraphic model of the subsurface region showing a representation of a plurality of layers of the subsurface region mapped with respect to total vertical depth (TVD) and total horizontal length (THL); initializing a first gramma ray model at the control system, the first gamma ray model comprising reference gamma ray values indexed over the THL, wherein the reference gamma ray values are obtained during the drilling of the at least one reference well into the subsurface region; receiving first gamma ray measurements at the control system from a gamma ray sensor coupled to a first tool of a first drill string traversing the subsurface region during the drilling of an additional well, wherein the control system indexes the received first gamma ray measurements over a first portion of the THL; determining that a first difference between the reference gamma ray values indexed over the first portion of the THL and the received first gamma ray measurements indexed over the first portion of the THL exceeds a first error threshold with the control system; updating the first stratigraphic model based on the first difference to create a first updated first stratigraphic model comprising an updated representation of the position of the plurality of layers of the subsurface region; updating the first gamma ray model to create a first updated first gamma ray model comprising first updated gamma ray values; and sending at least one signal with the control system, wherein the at least one signal comprises instructions to steer the first tool of the first drill string in a trajectory based on the first updated first stratigraphic model.

BRIEF DESCRIPTION OF DRAWINGS

The appended figures illustrate only exemplary embodiments and are therefore not to be considered limiting of the scope of the disclosure, as the disclosure may admit to other equally effective embodiments.

FIG. 4A also illustrates a predicted stratigraphic model, according to one or more embodiments.

FIG. 4B also illustrates an updated predicted stratigraphic model, according to one or more embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure provide systems, apparatus, and methods for updating a stratigraphic model of a wellbore while the wellbore is drilled. The stratigraphic model is initially based on gamma ray values obtained from one or more reference wells. The stratigraphic model is used to drill the wellbore. While the wellbore is being drilled, gamma ray values are measured and compared against the gamma ray values from the reference well. The comparison of the measured gamma ray values and the reference well gamma ray values is used to update the stratigraphic model while the wellbore is being drilled. In some embodiments, the updated stratigraphic model is used to update the trajectory of the drill string being used to drill the wellbore.

Figure 1:
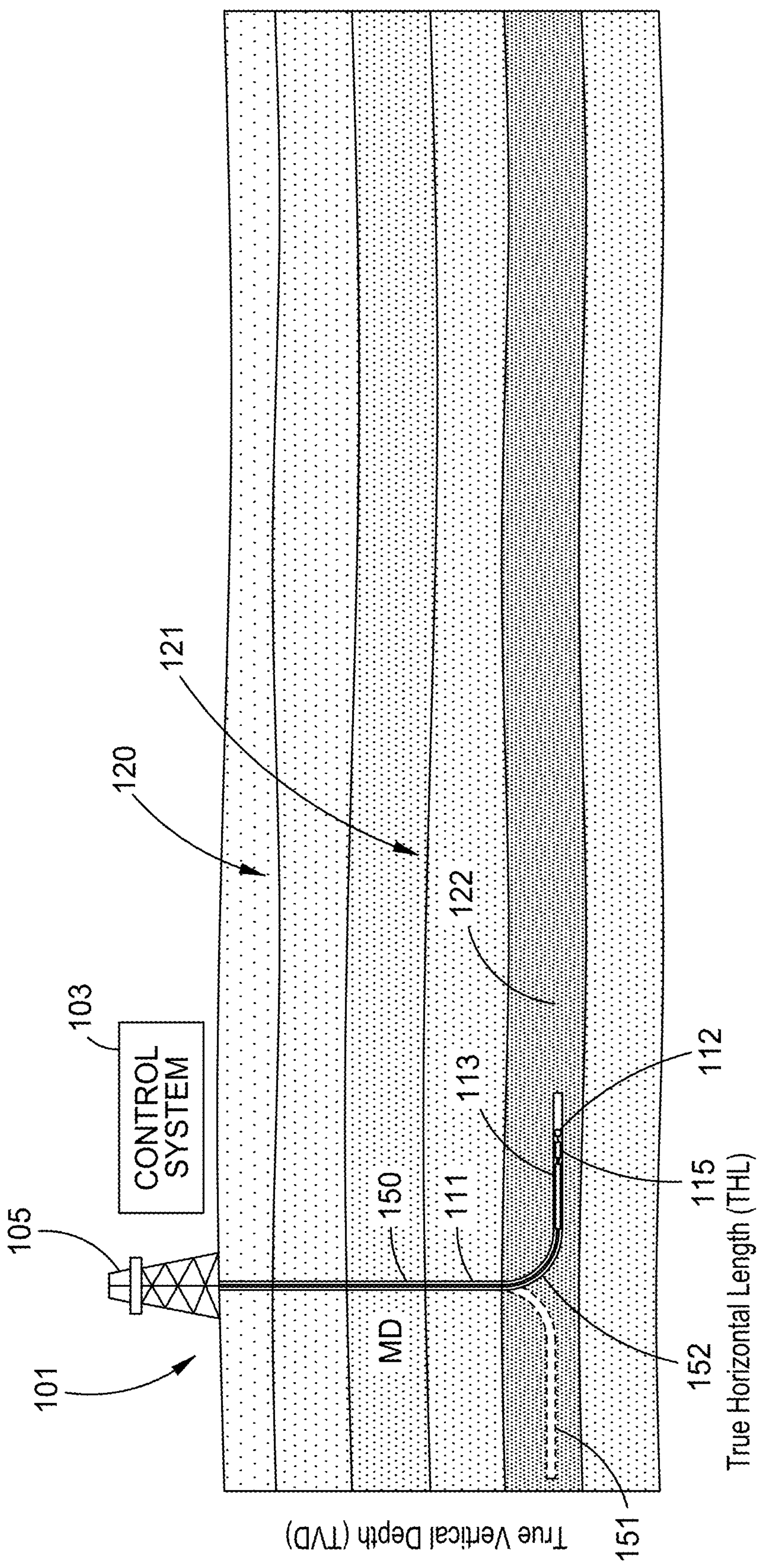
FIG. 1 illustrates an example drilling site, according to one or more embodiments.

FIG. 1 illustrates an example drilling site 100 which has a drilling rig 105 (e.g. derrick) disposed over a field 101. As shown, a wellbore system 150 is being drilled into the subsurface region 120. The subsurface region 120 includes one or more layers 121. Each layer 121 represents a layer of rock. One or more target layers 122 are shown in the subsurface region 120. The one or more target layers 122 are hydrocarbon bearing, such as being a hydrocarbon bearing shale. The one or more target layers 122 may be surrounded by one or more layers 121 of non-hydrocarbon bearing rock, such as a sandstone.

The wellbore system 150 is being drilled into the one or more target layers 122. The wellbore system 150 includes at least one reference well 151 and at least one well 152 that is drilled into the subsurface region 120 using the stratigraphic model and gamma ray data obtained during the drilling of the at least one reference well 151.

The least one reference well 151 is drilled into the one or more target layers 122 before well 152. Gamma ray data obtained during the drilling of the at least one reference well 151 may be used as a baseline prediction for the characteristics of the one or more layers 121 in the subsurface region 120 during the drilling of the well 152. For example, a stratigraphic model of the reference well 151 generated using the obtained gamma ray data may be used as an initial stratigraphic model for well 152. In some embodiments, multiple reference wells 151 may be drilled into the subsurface region 120 before well 152.

The well 152 is drilled using a drill string 111 including a drill bit 112 at the end of the drill string to drill. The drill string 111 also includes a gamma ray module 113 near the drill bit 112 to obtain gamma ray measurements as the drill bit 112 traverses through the subsurface region 120. The drill string 111 also includes steering module 115 to steer the drill bit 112 along a trajectory through the subsurface region 120.

The gamma ray data obtained from the gamma ray module 113 is used to understand the properties of rock as the drill string 111 traverses the subsurface region 120. The gamma ray data may be used to determine which rock type, such as which layer 121, that the gamma ray module 113 is currently traversing. This gamma ray data obtained by the gamma ray module 113 is communicated uphold to the control system 103 for analysis.

Stratigraphic modeling can be used to generate a stratigraphic model showing the position and characteristics of the layers 121 of the subsurface region 120. In some embodiments, stratigraphic modes show the position of the layers 121 over the true horizontal length (THL) of the well versus the true vertical depth (TVD) of the well. FIG. 1 illustrates the TVD and THL for the well 152.

The well 152 may be planned and drilled using a stratigraphic model of generated by data obtained from the at least one reference well 151. For example, the initial trajectory of the drill string 111 into the subsurface region 120 may be based on the reference well stratigraphic model. However, the reference well(s) 151 was not drilled along the same trajectory as the well 152. Natural variations in subsurface region, such as variations in the position of the layers 121, may be encountered during the drilling of the well 152. In other words, the reference well stratigraphic model may not explain the gamma ray data being obtained during the drilling of the well 152 to the variation in the position of the layers 121. As will be explained herein, the gamma ray data obtained while drilling the well 152 is used to update the stratigraphic model, allowing the drill bit 112 to be steered toward and steered through the one or more target layers 122.

The drilling rig 105 further includes a control system 103. The control system 103 is used to control (e.g. drill and steer) the drill string 111. The control system 103 may do so based on a stratigraphic model. The control system 103 also receives information from the gamma ray module 113 and the drill string 111 including, but not limited to the measured gamma ray, and current trajectory of the drill bit 112. The control system 103 also tracks the measured depth (MD) of the well 152. The control system 103 can also determine the current TVD and THL of the well 152. The measured gamma ray obtained by the gamma ray module 113 is indexed with respect to the TVD and THL at which the data was obtained. The control system 103 may also be configured to predict, analyze, modify, output (such as by a user interface), and receive stratigraphic models and may use said stratigraphic models to steer the drill bit 112.

In some embodiments, the control system 103 may generate stratigraphic models of subsurface regions based on trends in the data obtained during the drilling of one or more wells, additional wells, or reference wells 151. Additionally, the control system 103 may learn one or more characteristics about one or more layers 121 of the subsurface region 120 based on each subsequent well; thus, each generated model for the subsurface region 120 may build upon the analysis performed to generate a prior model of a subsurface region. Thus, a well 152 may be a reference well 151 for a later drilled well 152.

In some embodiments, the control system 103 may be located at the drilling site 100, such as being located on or near the drilling rig 105. In some embodiments, the control system 103 may be remote to the drilling rig 105. For example, the control system 103 may include one or more devices and servers that are remote to the drilling rig 105. The control system 103, even if remote, is in communication with the drilling rig 105.

The control system 103, in addition to performing methods 1000, 2000, may control one or more operations of the drilling rig 105. For example, the control system 103 may be used to control the drill string 111 during the drilling of the reference well 151 and can be used to control the drill string 111 during the drilling operations described herein. For example, the control system 103 may control the rotational speed of the drill string 111 and to control the steering module 115.

The control system 103 may include a programmable central processing unit (CPU) which is operable with a memory (e.g., non-transitory computer readable medium and/or non-volatile memory) and support circuits. The support circuits are coupled to the CPU and includes cache, clock circuits, input/output subsystems, power supplies, and the like, and combinations thereof coupled to the various components of the drilling rig 105, to facilitate performing one or more operations of methods 1000, 2000. For example, in one or more embodiments the CPU is one of any form of general purpose computer processor used in an industrial setting, such as a programmable logic controller (PLC), for controlling various polishing system components and sub-processors. The memory, coupled to the CPU, is non-transitory and is one or more of readily available memory such as random access memory (RAM), read only memory (ROM), floppy disk drive, hard disk, or any other form of digital storage, local or remote.

Herein, the memory is in the form of a computer-readable storage media containing instructions (e.g., non-volatile memory), that when executed by the CPU, facilitates the generation models of subsurface regions. The instructions in the memory are in the form of a program product such as a program that implements the methods of the present disclosure (e.g., middleware application, equipment software application, etc.). The program code may conform to any one of a number of different programming languages. In one or more embodiments, the disclosure may be implemented as a program product stored on computer-readable storage media for use with a computer system. The program(s) of the program product define functions of the embodiments (including the methods and operations described herein).

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

The various methods (such as methods 1000, 2000) and operations disclosed herein may generally be implemented under the control of the CPU of the control system 103 by the CPU executing computer instruction code stored in the memory as, e.g., a software routine. When the computer instruction code is executed by the CPU, the CPU conducts operations in accordance with the various methods and operations described herein. In one or more embodiments, the memory (a non-transitory computer readable medium) includes instructions stored therein that, when executed, cause the method (such as the methods 1000, 2000) described herein to be conducted. The operations described herein can be stored in the memory in the form of computer readable logic.

As noted above, measured gamma ray is indicative of the type of rock, such as a layer, that the gamma ray module 113 is disposed within at the time the measurement was recorded. As such, the gamma ray data obtained from the reference well 151 can be used to generate stratigraphic models of the subsurface region 120. The stratigraphic models can be used during drilling to steer drill string 111 along a desired trajectory. As stated above, reference well(s) 151 are drilled before drilling well 152 to obtain measured gamma ray for the reference well 151. That measured gamma ray for the reference well is used to generate a reference well stratigraphic model. The reference well stratigraphic model is suggestive of the stratigraphy of the subsurface region 120, such as the stratigraphy along the planned trajectory of the well 152. The stratigraphic model of the reference well 151 is hereinafter referred to as the predicted stratigraphic model, as the stratigraphic model of the reference well 151 is predictive of the stratigraphy of the subsurface region 120 that that well 152 is being drilled into. Additionally, the gamma ray obtained from the reference well 151 is also suggestive of the gamma ray data that will be obtained during the drilling of the well 152. Thus, the reference well gamma ray data is hereinafter referred to as the predicted gamma ray.

However, and as noted above, natural variations are present in the position and thickness of the one or more layers 121 of the subsurface region 120. Thus, the gamma ray data obtained during the drilling of the well 152 at one or more points along the TVD and THL may deviate from the predicted gamma ray value at similar points along the TVD and THL of the reference well 151. The control system 103 then adjusts the predicted gamma ray and updates the stratigraphic model based on the gamma ray data obtained during the drilling of the well 152. Similarly, the gamma ray data obtained during the drilling of the well 152 may show that the drill bit 112 is drilling into a layer 121 that is not consistent with the predicted stratigraphic model. For example, the gamma ray data may reflect that the drill bit 112 has exited the target layer 122.

In an exemplary drilling operation, a well system 150 is drilled and a reference well 151 is drilled laterally from that well system 150. As the reference well 151 is drilled, gamma ray data is gathered from the gamma ray module 113. Gamma ray data gathered from the reference well 151 is used to generate a gamma ray model of the reference well 151 and a stratigraphic model of the reference well 151. In some embodiments, well 152 is then drilled laterally in a different direction or at a different starting depth as compared the reference well 151 using the reference well gamma ray model as a predicted gamma ray model for the well 152 and the reference well stratigraphic model as a predicted stratigraphic model for the well 152. The predicted gamma ray model and the predicted stratigraphic model are used to steer the drill string 111 toward target layers 122. As the well 152 is being drilled, gamma ray data is being gathered from the gamma ray module 113 and is being compared to the predicted gamma ray model. The gathered gamma ray is used to update the predicted gamma ray model and the predicted stratigraphic model to accurately predict and model the subsurface region 120. Updating the predicted gamma ray model and the predicted stratigraphic model allows for more accurate modeling of the wellbore 152. Updating the predicted gamma ray model and the predicted stratigraphic model also allows for more accurate steering of the drill string 111 within the target layers 122. In some embodiments, the control system 103 updates the predicted gamma ray model, updates the predicted stratigraphic model, and steers the drill string 111 based on the updated predicted gamma ray model and the updated predicted stratigraphic model.

Figure 2A:
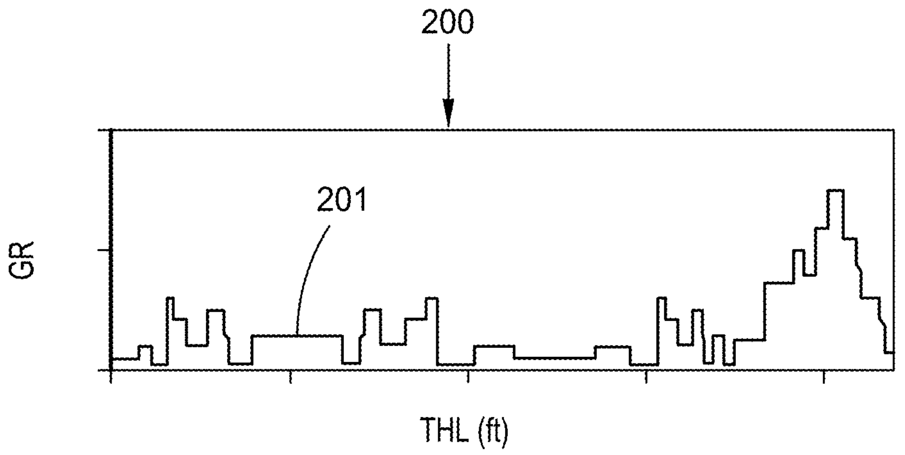
FIG. 2A illustrates a plot of predicted gamma ray model, according to one or more embodiments.
Figure 2B:
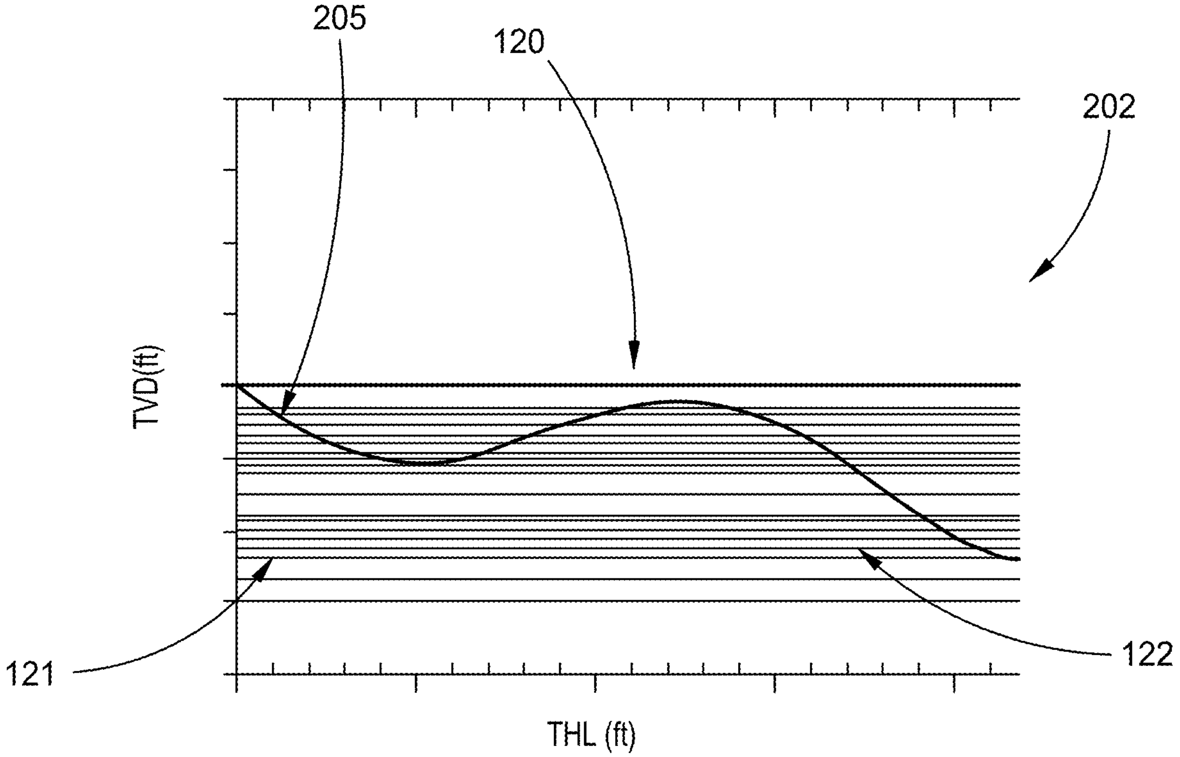
FIG. 2B illustrates a predicted stratigraphic model, according to one or more embodiments.

FIG. 2A illustrates a predicted gamma ray model 200 which shows predicted gamma ray 201 indexed over THL obtained from a reference well 151. FIG. 2B illustrates a predicted stratigraphic model 202 obtained from the reference well 151 generated using the predicted gamma ray model 200 shown in FIG. 2A. This predicted stratigraphic model 202 is used as a starting point for modeling the subsurface region 120 during the drilling of the well 152. The predicted stratigraphic model 202 is initially used to guide the drill bit 112 through the subsurface region 120 toward the target layer 122.

FIG. 2B illustrates the predicted stratigraphic model 202 including a graphical depiction of the layers 121 of the subsurface region 120. The lighter layers reflect non-hydrocarbon bearing layers. The target layers 122 are shown as being darker layers. FIG. 2B also shows the trajectory 205 of the reference well 151. As shown in FIGS. 2A and 2B, the gamma ray values are highest when the trajectory 205 passes through the target layers 122.

However, the predicted gamma ray 201 and predicted stratigraphic model 202 of FIGS. 2A and 2B, respectively, may not match the gamma ray or the stratigraphy of the subsurface region 120 traversed during the drilling of the well 152. As such, the predicted gamma ray 201 and the predicted stratigraphic model 202 need to be modified to ensure accuracy and usability in modeling and drilling operations of the well 152.

Figure 3A:
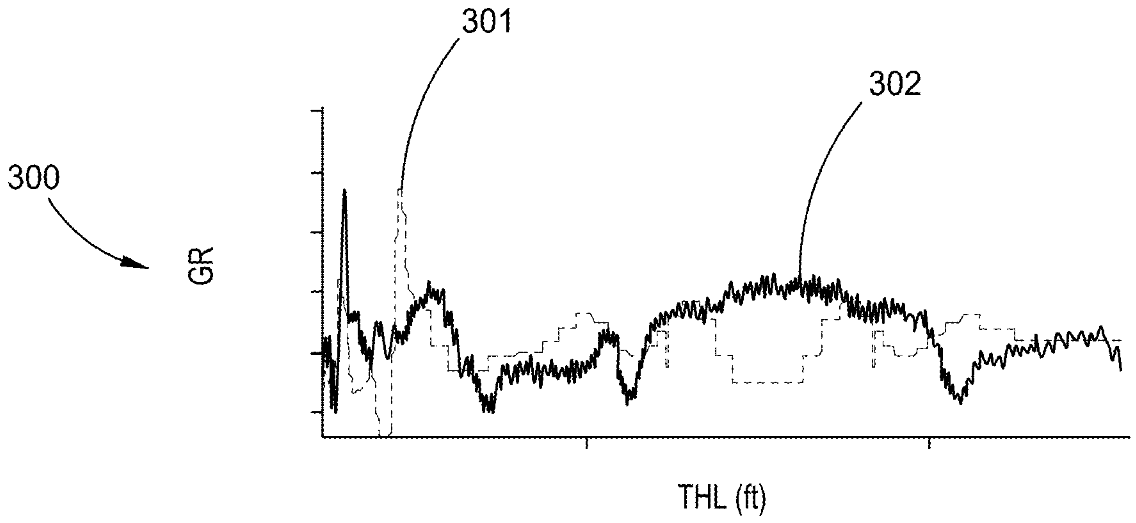
FIG. 3A illustrates a predicted gamma ray model, based on a reference well, overlaid with measured gamma ray values obtained during the drilling of an additional well, according to one or more embodiments.
Figure 3B:
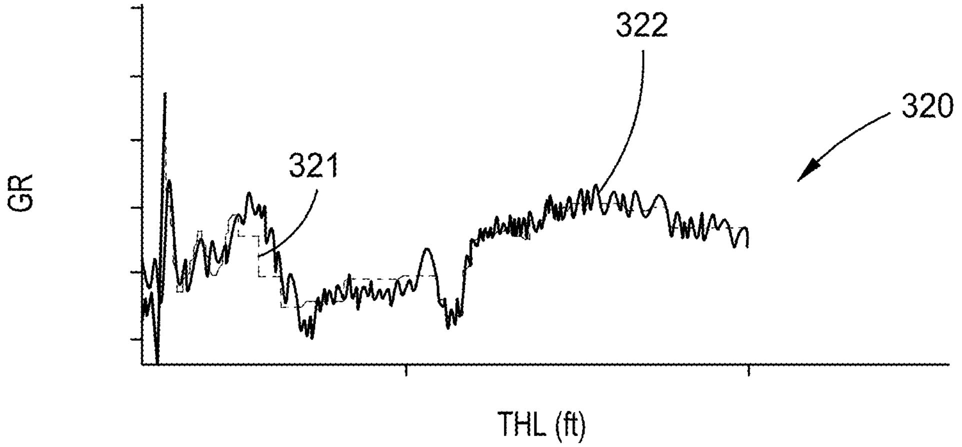
FIG. 3B illustrates a predicted gamma ray model, based on a reference well, overlaid with measured gamma ray values obtained during the drilling of an additional well, according to one or more embodiments.

The gamma ray model (e.g., predicted gamma ray values) and predicted stratigraphic model are initialized based on the starting point of the well being drilled. FIGS. 3A and 3B each illustrate a plot of reference well gamma ray values overlaid with gamma ray values obtained during the drilling of an additional wellbore, such as wellbore 152. As will be explained, FIGS. 3A and 3B show the effect of using a wrong starting point of the additional well 152 being drilled with respect to the reference well 151.

The new well being drilled, such as well 152, may be a sidetrack from the reference well 151. Thus the well 152 may start at a different depth than the reference well 151. Accounting for the starting point of the well 152 will provide a stronger correlation between the gamma ray data obtained from the reference well 151 and the gamma ray data obtained during the initial drilling of the well 152. In other words, accounting for the starting point of the well 152 provides a more accurate predicted gamma ray model.

FIG. 3A illustrates a predicted gamma ray model 300 which includes predicted gamma ray 301 values along the THL of the reference well 151. Gamma ray values 302 obtained from the well 152 are overlaid with the predicted gamma ray 301. As shown in FIG. 3A, the gamma ray values 302 from the wellbore 152 are not consistent with the predicted gamma ray values 301 because of the differential between the starting point of the well 152 and the starting point of the reference well 151 has not been accounted for.

FIG. 3B illustrates an initialized gamma ray model 320 which includes predicted gamma ray values 321 obtained from the reference well 151. The predicted gamma ray values 321 are calibrated by taking into account the starting point (e.g., starting depth) of the well 152. For example, the gamma ray values obtained from the reference well 151 may be calibrated by shifting the plot of gamma ray values along the x-axis. Thus, the control system 103 initializes the gamma ray model 320 by calibrating the gamma ray values obtained from the reference well 151 based on the starting point of the new well, such as well 152, being drilled. FIG. 3B shows the gamma ray values 322 obtained from the well 152 overlaid with the predicted gamma ray values 321. As shown, the gamma ray values 322 match the predicted gamma ray values 321 better due to the control system 103 accounting for the starting point of the well 152.

The predicted stratigraphic model is also initialized based on the starting point of the well 152, such as the starting TVD and starting THL, to increase the accuracy of the predicted stratigraphic model used to initially guide the drill string 111 during drilling of the well 152. For example, the initialized stratigraphic model may show the predicted stratigraphy of the layers 121 of the subsurface region 120 based on the starting point of the well 152.

In some embodiments, the initialization of the gamma ray model and predicted stratigraphic model is done in a first window of THL while the well 152 is drilled. For example, the first window of THL may be 100 ft. The control system 103 may analyze the obtained gamma ray values within the first window with the predicted gamma ray values within the first window. The control system 103 may recognize an offset in the obtained gamma ray values and the predicted gamma ray values due to a different starting point of the well 152. The control system 103 then adjusts the predicted gamma ray model based on the offset. The control system 103 may then initialize the predicted stratigraphic model once the predicted gamma ray model has been adjusted within the first window.

Figure 4A:
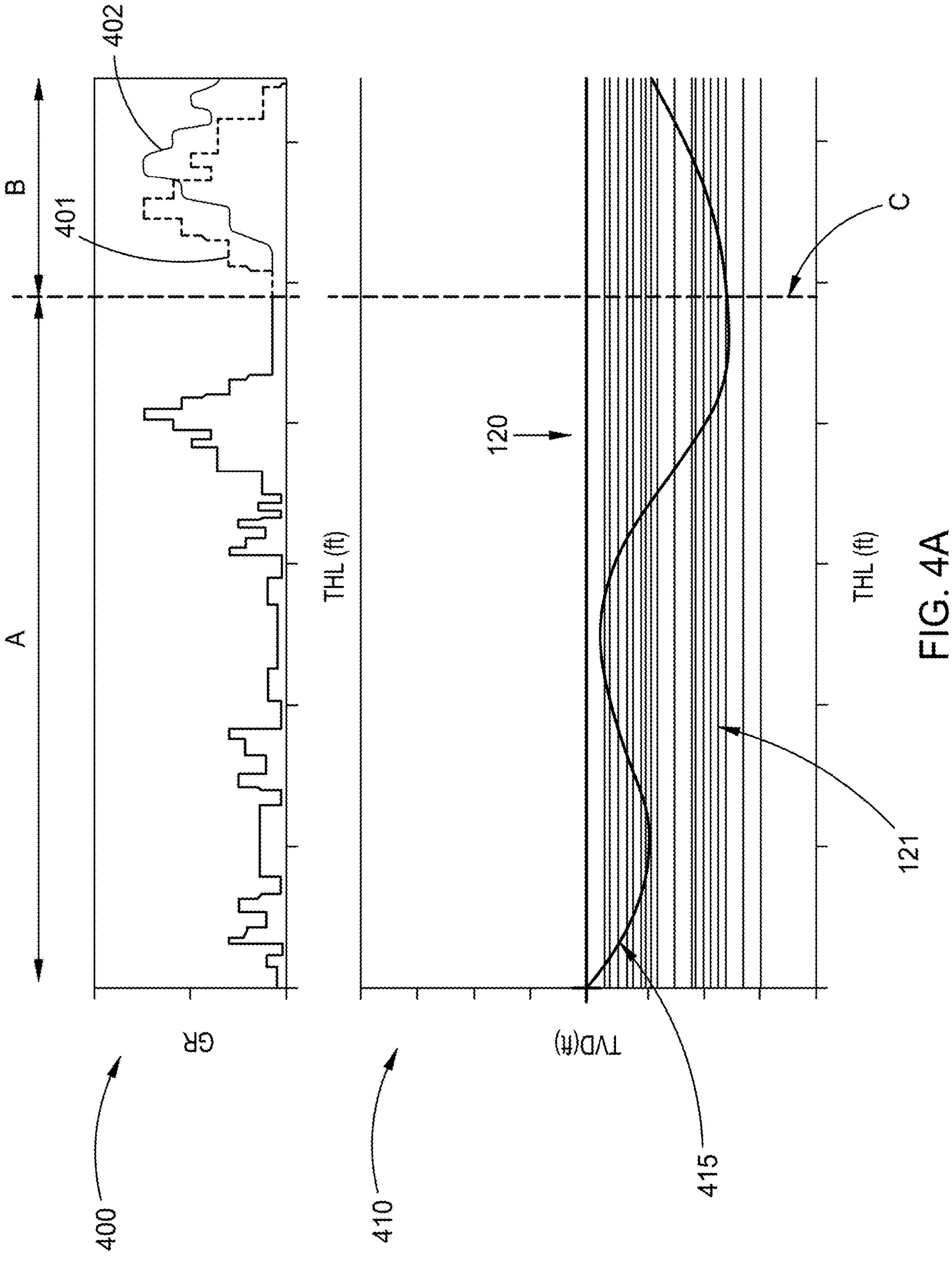
FIG. 4A illustrates a predicted gamma ray model overlaid with measured gamma ray values obtained during drilling of a well.

FIG. 4A illustrates a gamma ray model 400 which shows predicted gamma ray 401 indexed over THL. As explained above, the predicted gamma ray 401 is obtained during the drilling of at least one reference well 151. FIG. 4A also shows a predicted stratigraphic model 410 generated using the data of the at least one reference well 151 mapped over TVD and THL based on the gamma ray model 400. FIG. 4A also illustrates measured gamma ray 402 indexed over THL as retrieved from the gamma ray module 113 during the drilling of well 152 as the drill string 111 follows the trajectory 415 into the subsurface region 120. The trajectory 415 is overlaid onto the predicted stratigraphic model 410.

The gamma ray data 402 (e.g., measured gamma ray data 402) obtained from by the gamma ray module 113 is sent to the control system 103. In some embodiments, the gamma ray data 402 is communicated to the control system 103 in real time, such as the control system 103 receiving the data from the gamma ray module 113 within minutes (e.g., less than 5 minutes) of the gamma ray data 402 being obtained downhole. During the drilling operation, the measured gamma ray 402 obtained during the drilling of well 152 is compared to the predicted gamma ray 401. This comparison is done to determine whether or not the predicted gamma ray 401, and, therefore, the predicted stratigraphic model 410, is an accurate model of the subsurface region 120 or if the gamma ray model 400 and predicted stratigraphic model 410 need to be modified. The control system 103, however, is not looking for a perfect match between the measured gamma ray 402 and the predicted gamma ray 401. Instead, the control system 103 is analyzing the measure gamma ray 402 with respect to one or more parameters, such as a threshold, to determine if the measured gamma ray 402 is consistent with the predicted gamma ray 401.

As shown in FIG. 4A, the predicted gamma ray 401 of the gamma ray model 400 matches, and is thus consistent with, the measured gamma ray 402 along region A. However, at region B, the measured gamma ray 402 varies significantly from the predicted gamma ray 401. This variation establishes that there is a difference between the layer(s) 121 being traversed by the drill string 111 and the predicted layer(s) shown in the predicted stratigraphic model 410. This difference may be a natural variation in the rock, such as a layer being thinner or thicker than expected based on the reference well 151 or the layer having a different positon, such as the layer 121 being upshifted or downshifted. When a variation is detected, the gamma ray model 400 and the predicted stratigraphic model 410 need to be modified to account for the change in the stratigraphy of the subsurface region 120 encountered by the drill string 111. The modification provides a more accurate representation the actual structure of the subsurface region 120. The modification also allows for real time correction of the stratigraphic model and enables the control system 103 to send instructions to the steering module 115 based on the updated stratigraphic model to adjust the trajectory of the drill string 111. Thus, the control system 103 can have a faster reaction time between detecting that the drill string 111 is drilling into undesired layers, such as exiting target layers 122, and causing the steering module 115 to change the trajectory of the drill bit 112 to follow the target layers 122.

In some embodiments, the variation described above needs to surpass an error threshold to trigger modification. In such embodiments, the error threshold includes, but is not limited to, an error threshold that varies depending on the model. In some embodiments, there exists no error threshold, but amongst all of the possible modifications, the modification with the least amount of variation from the actual structure is selected no matter the value of that variation. In some embodiments, the error threshold may be optimized based on multiple iterations of the process.

Figure 4B:
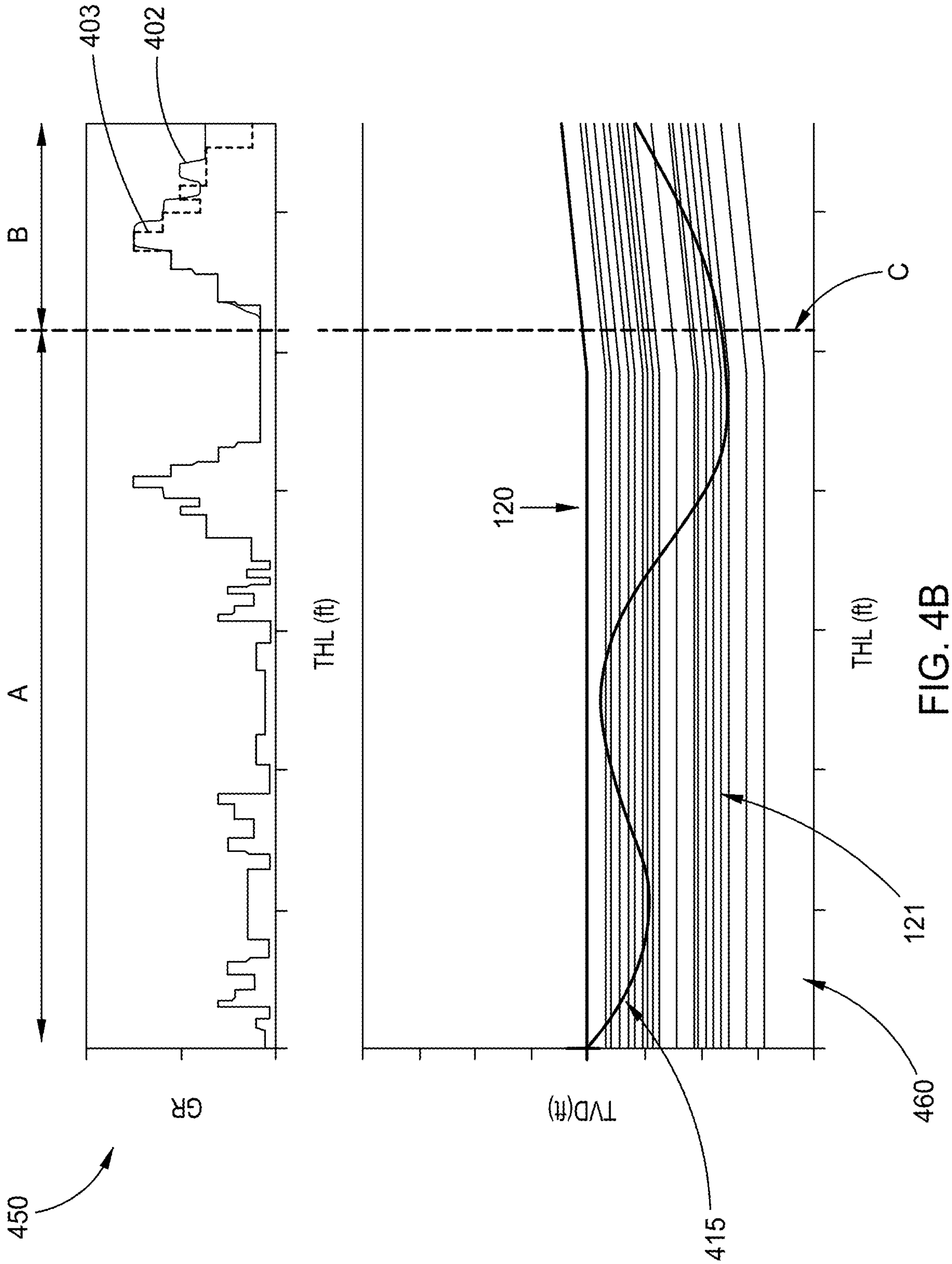
FIG. 4B illustrates a predicted gamma ray model that has been updated overlaid with measured gamma ray values obtained during drilling of a well.

FIG. 4B illustrates an updated gamma ray model 450 showing an updated predicted gamma ray 403 indexed over THL. The measured gamma ray 402 is overlaid over the updated gamma ray model 450. FIG. 4B also shows an updated predicted stratigraphic model 460 mapped over TVD and THL. Upon determining that there is a variation between the predicted gamma ray 401 and the measured gamma ray 402 indicating a difference in the predicted stratigraphic model 410 and the actual stratigraphy of the subsurface region 120 in region B, the predicted stratigraphic model 410 is shifted (or "hinged") at hinge point C to better match the stratigraphy of the subsurface region 120. The shift in the predicted stratigraphic model 410 causes a corresponding shift in the predicted gamma ray 401 to match the measured gamma ray 402. As shown, the portion of the predicted gamma ray 401 in region B in FIG. 4A was shifted to the left along the x-axis (e.g., THL) to produce the updated predicted gamma ray 403 shown in FIG. 4B.

As shown in FIG. 4B, the predicted stratigraphic model 410 has been shifted upward at an angle at hinge point C based on the measured gamma ray data 402. In other words, the control system 103 determined that the layers 121 were likely uplifting based on the measured gamma ray 402 and adjusted the position of the layers 121 in region B accordingly. This shift corresponds to a shift in the predicted gamma ray 401 causing the updated predicted gamma ray 403 to match the measured gamma ray 402 in region B. The updated stratigraphic model 460 is then used as the model of the subsurface region 120 and is also used to steer the drill bit 112 through the one or more target layers 122. This process can repeat at a new hinge point, with the updated predicted gamma ray 403 serving as the predicted gamma ray that is analyzed with respect to the measured gamma ray 402.

A mismatch in measured gamma ray 402 and the predicted gamma ray 401 does not alone establish how the stratigraphy of the subsurface region 120 differs from the predicted stratigraphic model 410. For example, the mismatch in the measured gamma ray 402 and predicted gamma ray 401 may be due to the drill bit 112 exiting the upper or lower boundary of the target layers 122, but the mismatch may not itself explain which boundary is being exited. When generating the updated stratigraphic model 460, the control system 103 will generate a plurality of proposed stratigraphic models that are each an attempt to explain the mismatch in the measured gamma ray 402 and the predicted gamma ray 401. The control system 103 selects the updated stratigraphic model out of the plurality of proposed models based on one or more criteria in an effort to select the model that best explains the stratigraphy of the subsurface region 120 encountered by the drill string 111.

Figure 5:
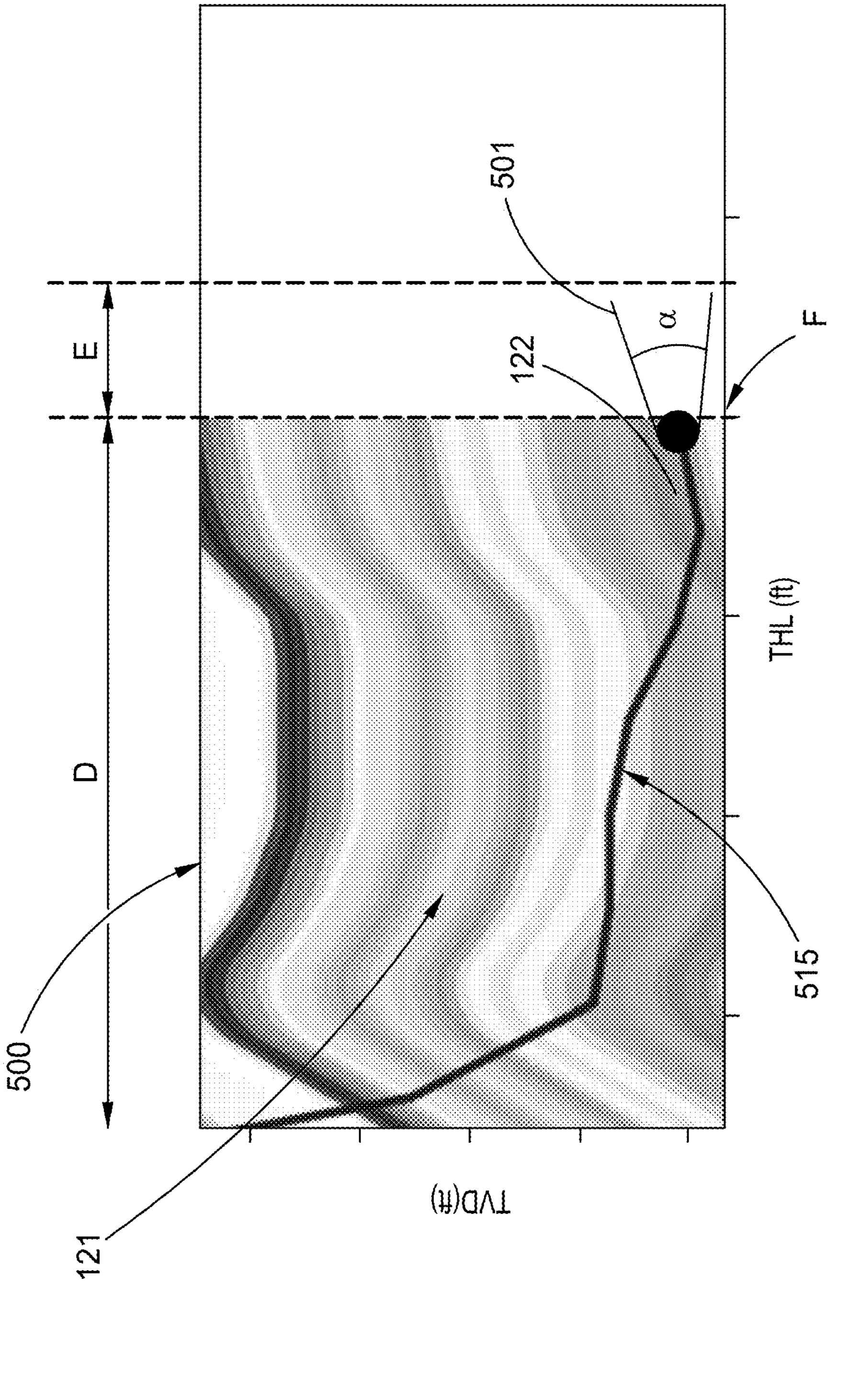
FIG. 5 illustrates a hinge point of a predicted stratigraphic model, according to one or more embodiments.

FIG. 5 is a graphical illustration of updating an exemplary predicted stratigraphic model based on an exemplary reference well 151. FIG. 5 also illustrates the trajectory 515 of drill string 111 in the subsurface region 120 as an exemplary well 152 is drilled. The trajectory 515 is overlaid onto the stratigraphic model 510. As stated previously, a discrepancy in measured gamma ray 402 versus predicted gamma ray 401 establishes that the predicted stratigraphy model 410 does not match the actual stratigraphy of the subsurface region 120 in region E. Shifting predicted stratigraphy model 410 upon determining there is a discrepancy between the predicted model 410 and the actual formation in the subsurface region 120 includes proposing a plurality of proposed stratigraphic models for region E at hinge point F based on one or more modeling parameters. Each proposed stratigraphic model may propose a different shift at the hinge point F along range of degrees 501. That is, each proposed stratigraphic model may include the layers 121 extending at a different angle within the range of degrees 501 at hinge point F. The range of degrees 501 may be based on the rock type. The control system 103 selects a proposed stratigraphic model at hinge point F based on one or more criteria to create the updated predicted stratigraphic model 460. Each proposed stratigraphic model may be analyzed based on one or more metrics, and the proposed stratigraphic model with the highest score may be selected. In some embodiments, the control system 103 may use Artificial Intelligence or Machine Learning to propose the plurality of proposed stratigraphic models at the hinge point as described above.

The updated predicted gamma ray 403 is generated from the updated predicted stratigraphic model 460. This process can repeat at a new hinge point, with the updated predicted gamma ray 403 serving as the predicted gamma ray that is analyzed with respect to the measured gamma ray 402 and the updated predicted stratigraphic model 460 serving as the predicted stratigraphic model 410. Thus, updating a predicted stratigraphic model is an iterative process occurring at hinge points separated by a window of THL (e.g. region D, ending at hinge point F). In some embodiments, the window of THL in which each iterative step occurs may vary based on one or more modeling parameters.

If the window size is fixed to a certain THL for every iterative step, the selected proposed model at each hinge point might get stuck at a local minimum and may continuously generate incorrect updated stratigraphic models causing the updated predicted stratigraphic model 460 to stray further and further from the true subsurface region 120. To overcome this limitation, the iterative process described above further includes iteratively proposing and selecting update windows that may or may not have the same THL values. In such embodiments, when updating the predicted stratigraphic model 500, the control system 103 will generate a plurality of proposed update windows of THL wherein each of these iterative steps is to take place. In other words, the window size may vary. The control system 103 selects the update window of THL for which the iterative step takes place from the plurality of proposed update windows based on one or more criteria in an effort to select the update window that leads to the least about of mismatch in measured gamma ray and predicted gamma ray.

Figure 6A:
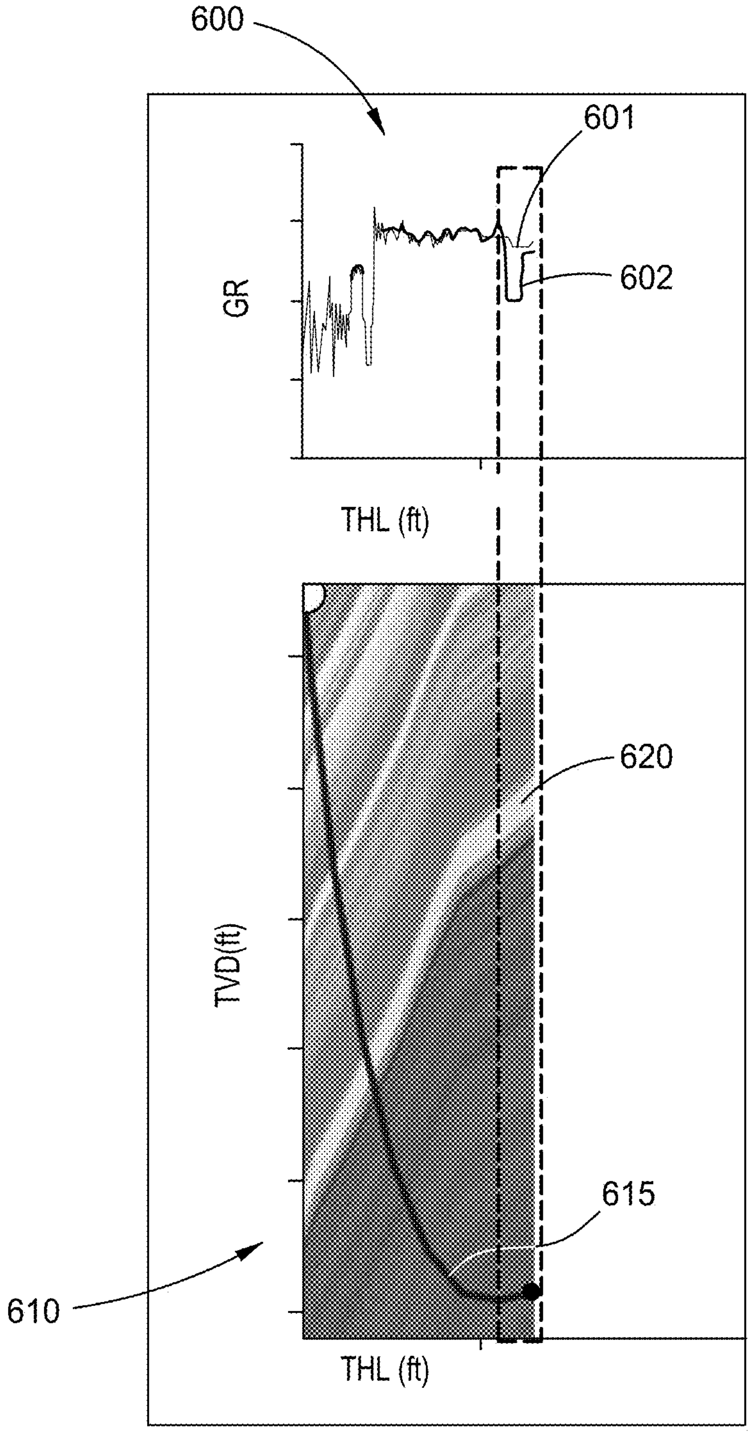
FIG. 6A illustrates a first analysis window of a gamma ray model and stratigraphic model, according to one or more embodiments.
Figure 6B:
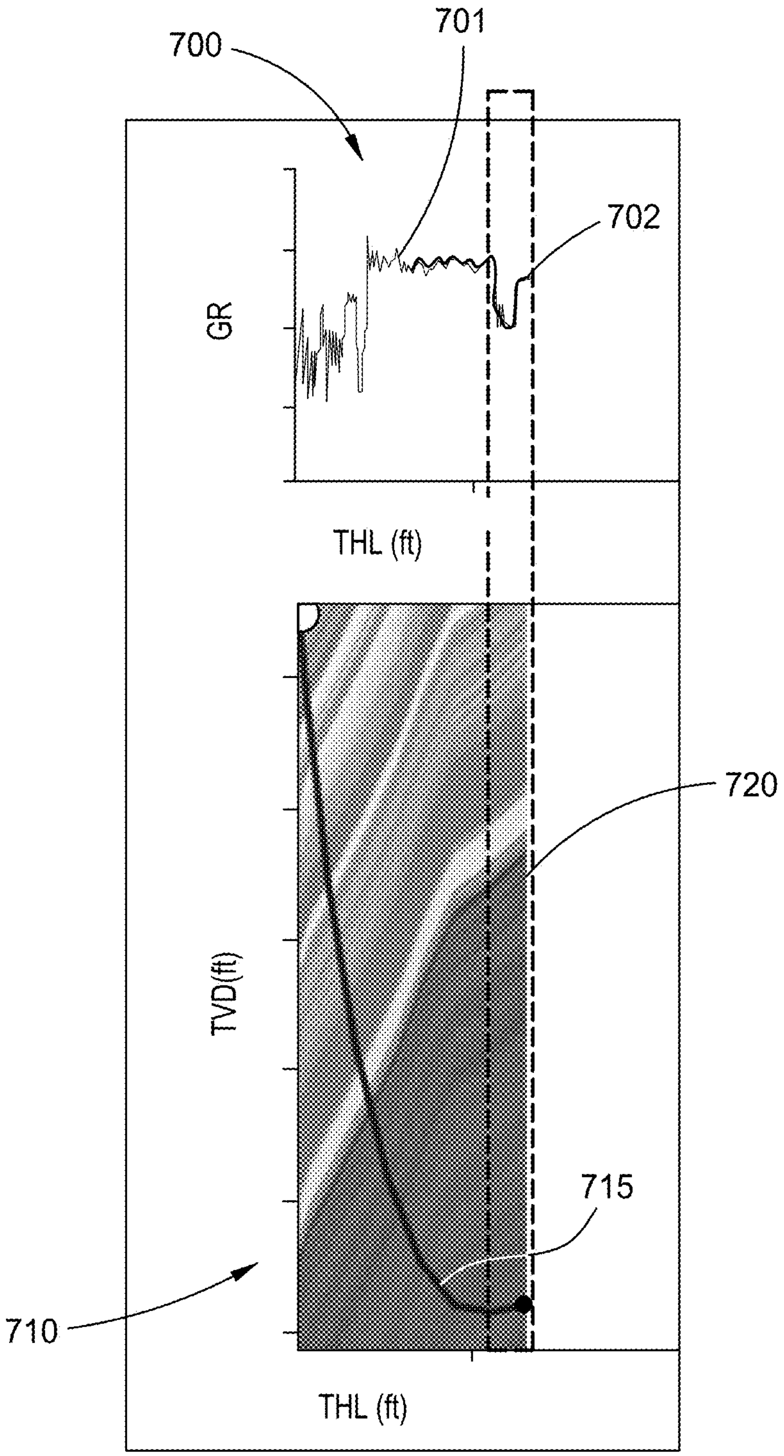
FIG. 6B illustrates a second analysis window of a gamma ray model and stratigraphic model, according to one or more embodiments.

FIGS. 6A-6B are a graphical illustration proposed update windows for an iterative step. FIG. 6A illustrates a gamma ray model 600 which shows predicted gamma ray 601 indexed over THL. FIG. 6A also shows a predicted stratigraphic model 610 mapped over TVD and THL based on the gamma ray model 600. FIG. 6A also illustrates measured gamma ray 602 indexed over THL as retrieved from the gamma ray module 113 as the drill string 111 drills well 152 along the trajectory 615 into the subsurface region 120. The trajectory 615 is overlaid onto the stratigraphic model 610. FIG. 6A illustrates an updated stratigraphic model 610 that has been updated according to the above described process with a window 620 of THL=100 ft.

Whereas, FIG. 6B illustrates a gamma ray model 700 which shows predicted gamma ray 701 indexed over THL of the same reference well 151. FIG. 6B also shows a predicted stratigraphic model 710 mapped over TVD and THL based on the gamma ray model 700. FIG. 6B also illustrates measured gamma ray 702 indexed over THL as retrieved from the gamma ray module 113 as the drill string 111 follows the trajectory 715 into the subsurface region 120. The trajectory 715 is overlaid onto the stratigraphic model 710. FIG. 6B illustrates an updated stratigraphic model 710 that has been updated according to the above described process with a window 720 of THL=200 ft. Between windows 620 and 720, the control system would select window 720 at a THL=200 ft to minimize the mismatch between measured gamma ray and predicted gamma ray even though window 720 has a lower resolution compared to window 620.

That is, at each comparison step described above (comparing measured gamma ray 401 to the predicted gamma ray 201 and modifying or not modifying the predicted stratigraphic model 202), the analysis window where that comparison is taking place is also being varied. A first window, such as the window 620 of FIG. 6A is proposed, and a second window, such as the window 720 of FIG. 6B is proposed. The difference between measured gamma ray 401 and predicted gamma ray 201 for the first window is determined and the difference between the measured gamma ray 401 and the predicted gamma ray 201 for the second window is determined. Finally, one of the windows is selected based on those differences so that a proposed hinge point 501 of the predicted stratigraphic model can best match the true formation of the subsurface region 120.

Figure 7:
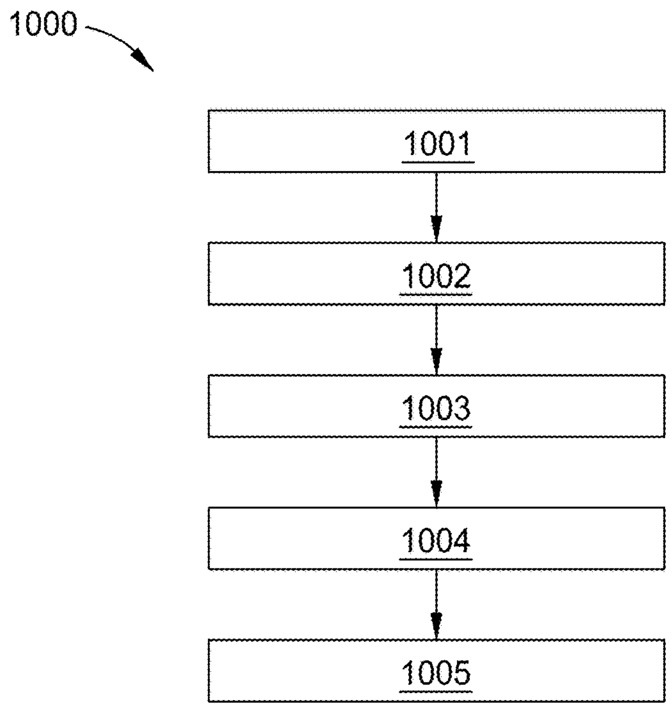
FIG. 7 illustrates a method for modeling a subsurface formation, according to one or more embodiments.

FIG. 7 illustrates a method 1000 for modeling a subsurface formation in a subsurface region (such as subsurface region 120 of FIG. 1).

At operation 1001, a reference well 151 is drilled to obtain reference well gamma ray values. These reference well gamma ray values are used to generate a reference well stratigraphic model (such as predicted stratigraphic model 202 and layers 121 of FIG. 2).

In some embodiments, the reference well stratigraphic model graphically representing the position of one or more layers 121 of a subsurface region 120 (such as predicted stratigraphic model 202 shown in FIG. 2) is initialized and the reference well gamma ray model comprising reference gamma ray values (such as predicted gamma ray model 200 with predicted gamma ray values 201 of FIG. 2) is initialized at operation 1001. The initialized stratigraphic model shows a representation of the one or more layers 121 of the subsurface region 120 mapped with respect to a TVD and THL. The TVD and THL of the stratigraphic models (i.e. the model for the reference well and for the additional well) may be standardized. In other words, the models may use a common axis.

At operation 1002, measured gamma ray (such as measured gamma ray 402 of FIGS. 4A-4B) is received from a tool (such as gamma ray module 113 of FIG. 1) traversing the subsurface region along a trajectory.

At operation 1003, a first difference between the reference gamma ray values and the received gamma ray values is determined.

As mentioned in the description of FIGS. 6A-6B, in some embodiments, determining a first difference between the reference gamma ray values and the received gamma ray values includes comparing the reference gamma ray values and the received gamma ray values over one or more windows of THL. The first difference is the difference between the received first gamma ray measurements and the reference gamma ray values in the one or more windows of THL. Further, the one or more windows may include a first window (such as window 620 of FIG. 6A) and a second window (such as window 720 of FIG. 6B) with varying THL values associated with the first window and second window.

At operation 1004, the first stratigraphic model is updated. As mentioned in the description of FIGS. 4A-4B and FIG. 5, updating the first stratigraphic model may include adjusting the position of the one or more of the plurality of layers. This may include generating proposed stratigraphic models at hinge points (such as hinge points C and F) that varies the position or angle of the one or more layers within a range (such as range 501 of FIG. 5), selecting one of the proposed stratigraphic models, and updating the first stratigraphic model based on the selected proposed stratigraphic model.

At operation 1005, the first gamma ray model is updated. Updating the first gamma ray model may include updating the first gamma ray model based on the updated stratigraphic model updated in operation 1004.

It should be noted that any and/or all of operations 1001-1005 of method 1000 may be accomplished by a control system (such as control system 103 of FIG. 1). The control system may be caused to act by a non-transitory computer readable medium including instructions that, when executed by a processor, cause the control system to accomplish any and/or all of operations 1001-1005 of method 1000. It should be further noted that the control system 103 may utilize artificial intelligence and/or machine learning to complete any and/or all of the operations 1001-1005.

Figure 8:
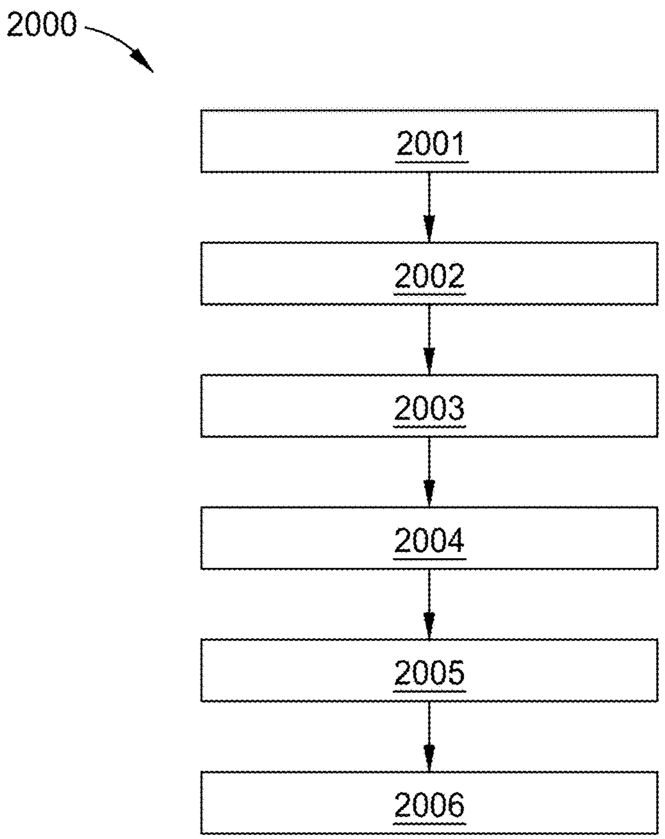
FIG. 8 illustrates a method for steering a tool string traversing a subsurface formation, according to one or more embodiments.

FIG. 8 illustrates a method 2000 for steering a tool string (such as drill string 111 of FIG. 1) traversing a subsurface formation of a subsurface region (such as subsurface region 120 of FIG. 1).

At operation 2001, a reference well 151 is drilled to obtain reference well gamma ray values. The gamma ray values obtained from the reference well are used to generate a reference well stratigraphic model (such as predicted stratigraphic model 202 and layers 121 of FIG. 2).

In some embodiments, the reference well stratigraphic model graphically representing the position of one or more layers 121 of a subsurface region 120 (such as predicted stratigraphic model 202 shown in FIG. 2) is initialized and the reference well. A gamma ray model comprising reference gamma ray values (such as predicted gamma ray model 200 with predicted gamma ray values 201 of FIG. 2) is initialized at operation 2001. The initialized stratigraphic model shows a representation of the one or more layers 121 of the subsurface region 120 mapped with respect to a TVD and THL. The TVD and THL of the stratigraphic models (i.e. the model for the reference well and for the additional well) may be standardized. In other words, the models may use a common axis.

At operation 2002, measured gamma ray (such as measured gamma ray 402 of FIGS. 4A-4B) is received from a tool (such as gamma ray module 113 of FIG. 1) traversing the subsurface region.

At operation 2003, a first difference between the reference gamma ray values and the received gamma ray values is determined.

As mentioned in the description of FIGS. 6A-6B, in some embodiments, determining a first difference between the reference gamma ray values and the received gamma ray values includes comparing the reference gamma ray values and the received gamma ray values over one or more windows of THL. The first difference is the difference between the received first gamma ray measurements and the reference gamma ray values in the one or more windows of THL. Further, the one or more windows may include a first window (such as window 620 of FIG. 6A) and a second window (such as window 720 of FIG. 6B) with varying THL values associated with the first window and second window.

At operation 2004, the first stratigraphic model is updated. As mentioned in the description of FIGS. 4A-4B and FIG. 5, updating the first stratigraphic model may include adjusting the position of the one or more of the plurality of layers. This may include generating proposed stratigraphic models at hinge points (such as hinge points C and F) that varies the position or angle of the one or more layers within a range (such as range 501 of FIG. 5), selecting one of the proposed stratigraphic models, and updating the first stratigraphic model based on the selected proposed stratigraphic model.

At operation 2005, the first gamma ray model is updated. Updating the first gamma ray model may include updating the first gamma ray model based on the updated stratigraphic model updated in operation 2004.

At operation 2006, at least one signal with instructions to steer the tool based on the first updated first stratigraphic model is sent to the tool, a user, and/or the control system. The instructions may include instructions to steer the drill bit 112 back to or toward a target layer (such as target layer 122 of FIG. 1) of the subsurface region. The instructions may include instructions to steer the tool in a different or the same trajectory with respect to TVD and THL of the subsurface region.

It should be noted that any and/or all of operations 2001-2006 of method 2000 may be accomplished by a control system (such as control system 103 of FIG. 1). The control system may be caused to act by a non-transitory computer readable medium including instructions that, when executed by a processor, cause the control system to accomplish any and/or all of operations 2001-2006 of method 2000. It should be further noted that the control system 103 may utilize artificial intelligence and/or machine learning to complete any and/or all of the operations 2001-2006.

The control system 103 may illustrate one or more of the, plots, gamma ray models and stratigraphic models described herein on a user interface. In some embodiments, each model may be shown on the user interface simultaneously.

It is contemplated that any one or more elements or features of any one disclosed embodiment or example may be beneficially incorporated in any one or more other non-mutually exclusive embodiments or examples. While the foregoing is directed to embodiments of the present disclosure, other and further embodiments of the disclosure may be devised without departing from the basic scope thereof, and the scope thereof is determined by the claims that follow.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

drilling of at least one reference well into a subsurface region;

initializing a first stratigraphic model of the subsurface region at a control system, the first stratigraphic model of the subsurface region showing a representation of a plurality of layers of the subsurface region mapped with respect to total vertical depth (TVD) and total horizontal length (THL);

initializing a first gamma ray model at the control system, the first gamma ray model comprising reference gamma ray values indexed over the THL, wherein the reference gamma ray values are obtained during the drilling of the at least one reference well;

receiving, in real time, first gamma ray measurements at the control system from a gamma ray sensor coupled to a first tool of a first drill string traversing the subsurface region during drilling of an additional well, wherein the control system indexes the received first gamma ray measurements over a first portion of the THL;

determining that a first difference between the reference gamma ray values indexed over the first portion of the THL and the received first gamma ray measurements indexed over the first portion of the THL exceeds a first error threshold with the control system;

updating the first stratigraphic model based on the first difference to create a first updated first stratigraphic model comprising an updated representation of a position of the plurality of layers of the subsurface region;

updating the first gamma ray model to create a first updated first gamma ray model comprising first updated gamma ray values;

transmitting, in real time during the drilling of the additional well, control signals to a steering module of the first drill string based on the first updated first stratigraphic model and the first updated first gamma ray model, wherein the control signals are generated based on a comparison between the first updated first gamma ray model and the received first gamma ray measurements; and steering, via the steering module and the control signals, the drill string to a hydrocarbon-bearing target layer.

2. The method of claim 1, further comprising:

receiving second gamma ray measurements at the control system from the gamma ray sensor, wherein the control system indexes the received second gamma ray measurements over a second portion of the THL;

determining that a second difference between the first updated gamma ray values indexed over the second portion of the THL and the received second gamma ray measurements indexed over the second portion of the THL exceeds a second error threshold with the control system;

updating the first updated first stratigraphic model based on the second difference to create a second updated first stratigraphic model comprising an updated representation of the position of the plurality of layers of the subsurface region;

updating the first updated first gamma ray model at the control system to create a second updated first gamma ray model; and outputting the second updated first stratigraphic model and the second updated first gamma ray model.

3. The method of claim 1, wherein determining that the first difference exceeds the first error threshold comprises:

comparing the received first gamma ray measurements to the reference gamma ray values over one or more initial windows of the first portion of the THL; and the first difference comprises a difference between the received first gamma ray measurements and the reference gamma ray values occurring within the one or more initial windows of the first portion of the THL.

4. The method of claim 3, wherein:

the one or more initial windows comprise a first initial window and a second initial window, wherein the first initial window extends along a first window value of the first portion of the THL and the second initial window extends along a second window value of the first portion of the THL, the first window value exceeding the second window value.

5. The method of claim 1, wherein initializing the first stratigraphic model comprises adjusting a starting point of the first stratigraphic model.

6. The method of claim 1, wherein the updated representation of the position of the plurality of layers of the subsurface region comprises an updated angle of at least one of the plurality of layers of the subsurface region.

7. The method of claim 1, wherein updating the first stratigraphic model comprises:

generating a plurality of proposed stratigraphic models each including an adjusted position of at least one layer with respect to the first stratigraphic model; and selecting one of the plurality of proposed stratigraphic models based on a modeling parameter, wherein the selected stratigraphic model is the first updated first stratigraphic model.

8. The method of claim 1, wherein the updating of the first gamma ray model comprises updating the first gamma ray model based on the first updated first stratigraphic model.

9. The method of claim 1, wherein the control signals are generated and applied in real time during the drilling of the additional well to adjust a drilling trajectory of the first drill string and steer the first tool of the first drill string within the hydrocarbon-bearing target layer.

10. A method for steering a first tool of a first drill string traversing a subsurface region, comprising:

drilling of at least one reference well into a subsurface region;

initializing a first stratigraphic model of the subsurface region at a control system, the first stratigraphic model of the subsurface region showing a representation of a plurality of layers of the subsurface region mapped with respect to total vertical depth (TVD) and total horizontal length (THL);

initializing a first gamma ray model at the control system, the first gamma ray model comprising reference gamma ray values indexed over the THL, wherein the reference gamma ray values are obtained during the drilling of the at least one reference well into the subsurface region;

receiving, in real time, first gamma ray measurements at the control system from a gamma ray sensor coupled to a first tool of a first drill string traversing the subsurface region during drilling of an additional well, wherein the control system indexes the received first gamma ray measurements over a first portion of the THL;

determining that a first difference between the reference gamma ray values indexed over the first portion of the THL and the received first gamma ray measurements indexed over the first portion of the THL exceeds a first error threshold with the control system;

updating the first stratigraphic model based on the first difference to create a first updated first stratigraphic model comprising an updated representation of a position of the plurality of layers of the subsurface region;

updating the first gamma ray model to create a first updated first gamma ray model comprising first updated gamma ray values;

sending, in real time during the drilling of the additional well, at least one control signal from the control system to a steering module of the first drill string based on the first updated first stratigraphic model and the first updated first gamma ray model, wherein the at least one control signal is generated based on a comparison between the first updated first gamma ray model and the received first gamma ray measurements; and steering, via the steering module and the at least one control signal, the first tool of the first drill string in a trajectory to a hydrocarbon-bearing target layer.

11. The method of claim 10, further comprising:
- receiving second gamma ray measurements at the control system from the gamma ray sensor, wherein the control system indexes the received second gamma ray measurements over a second portion of the THL of the additional well;
- determining that a second difference between the first updated gamma ray values indexed over the second portion of the THL and the received second gamma ray measurements indexed over the second portion of the THL exceeds a second error threshold with the control system;
- updating the first updated first stratigraphic model based on the second difference to create a second updated stratigraphic model comprising an updated representation of the position of the plurality of layers of the subsurface region; and
- updating the first updated first gamma ray model at the control system to create a second updated first gamma ray model.

12. The method of claim 10, wherein determining that the first difference exceeds the first error threshold comprises:
- comparing the received first gamma ray measurements to the reference gamma ray values over one or more initial windows of the first portion of the THL; and
- the first difference comprises a difference between the received first gamma ray measurements and the reference gamma ray values occurring within the one or more initial windows of the first portion of the THL.

13. The method of claim 12, wherein:
- the one or more initial windows comprise a first initial window and a second initial window, wherein the first initial window extends along a first window value of the first portion of the THL and the second initial window extends along a second window value of the first portion of the THL, the first window value exceeding the second window value.

14. The method of claim 10, wherein initializing the first stratigraphic model comprises adjusting a starting point of the first stratigraphic model.

15. The method of claim 10, wherein the updated representation of the position of the plurality of layers of the subsurface region comprises an updated angle of at least one of the plurality of layers of the subsurface region.

16. The method of claim 10, wherein updating the first stratigraphic model comprises:
- generating a plurality of proposed stratigraphic models each including an adjusted position of at least one layer with respect to the first stratigraphic model; and
- selecting one of the plurality of proposed stratigraphic models based on a modeling parameter, wherein the selected stratigraphic model is the first updated first stratigraphic model.

17. The method of claim 16, wherein the trajectory is based on a position of the hydrocarbon-bearing target layer of the plurality of layers of the subsurface region and a position of a drill bit of the first drill string relative to the hydrocarbon-bearing one target layer.

18. The method of claim 10, wherein the updating of the first gamma ray model comprises updating the first gamma ray model based on the first updated first stratigraphic model.

19. A non-transitory computer-readable medium comprising instructions stored thereon that when executed by one or more processors cause a control system to control a first drill string to target at least one target layer of a subsurface region, the controlling comprising:
- drilling of at least one reference well;
- initializing a first stratigraphic model of the subsurface region at a control system, the first stratigraphic model of the subsurface region showing a representation of a plurality of layers of the subsurface region mapped with respect to total vertical depth (TVD) and total horizontal length (THL);
- initializing a first gamma ray model at the control system, the first gamma ray model comprising reference gamma ray values indexed over the THL, wherein the reference gamma ray values are obtained during the drilling of the at least one reference well into the subsurface region;
- receiving, in real time, first gamma ray measurements at the control system from a gamma ray sensor coupled to a first tool of a first drill string traversing the subsurface region during drilling of an additional well, wherein the control system indexes the received first gamma ray measurements over a first portion of the THL;
- determining that a first difference between the reference gamma ray values indexed over the first portion of the THL and the received first gamma ray measurements indexed over the first portion of the THL exceeds a first error threshold with the control system;
- updating the first stratigraphic model based on the first difference to create a first updated first stratigraphic model comprising an updated representation of a position of the plurality of layers of the subsurface region;
- updating the first gamma ray model to create a first updated first gamma ray model comprising first updated gamma ray values;
- sending, in real time during the drilling of the additional well, at least one control signal from the control system to a steering module of the first drill string based on the first updated first stratigraphic model and the first updated first gamma ray model, wherein the at least one control signal is generated based on a comparison between the first updated first gamma ray model and the received first gamma ray measurements; and
- steering, via the steering module and the at least one control signal, the first tool of the first drill string to a hydrocarbon-bearing target layer.

20. The medium of claim 19, the controlling further comprising:
- receiving second gamma ray measurements at the control system from the gamma ray sensor, wherein the control system indexes the received second gamma ray measurements over a second portion of the THL;
- determining that a second difference between the first updated gamma ray values indexed over the second portion of the THL and the received second gamma ray measurements indexed over the second portion of the THL exceeds a second error threshold with the control system;
- updating the first updated first stratigraphic model based on the second difference to create a second updated stratigraphic model comprising an updated representation of the position of the plurality of layers of the subsurface region; and
- updating the first updated first gamma ray model at the control system to create a second updated first gamma ray model.

21. The medium of claim 19, wherein determining that the first difference exceeds the first error threshold comprises:
- comparing the received first gamma ray measurements to the reference gamma ray values over one or more initial windows of the first portion of the THL; and the first difference comprises a difference between the received first gamma ray measurements and the reference gamma ray values occurring within the one or more initial windows of the first portion of the THL.

* * * * *